United States Patent Office 3,479,496
Patented Nov. 18, 1969

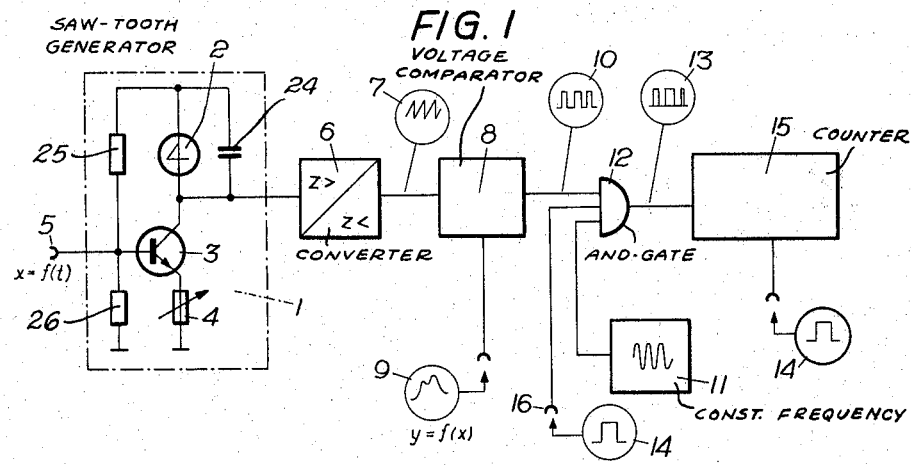
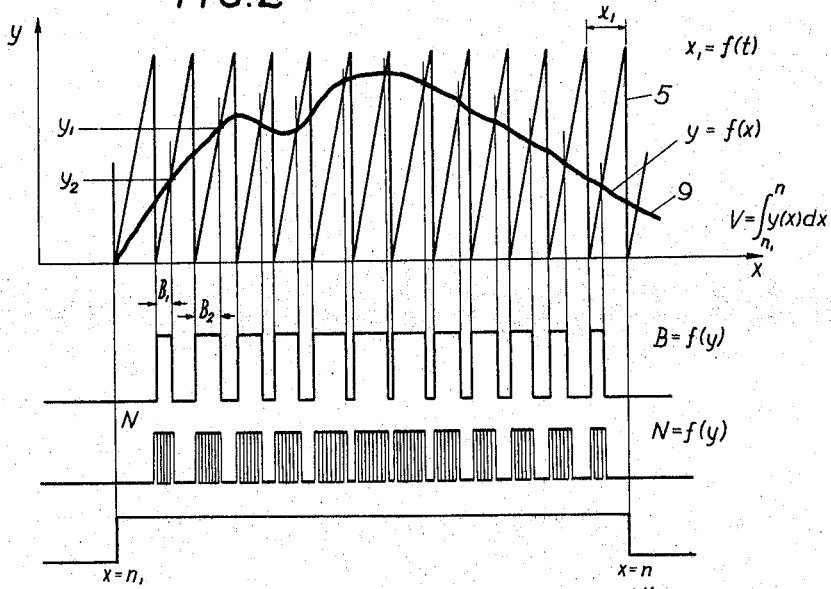
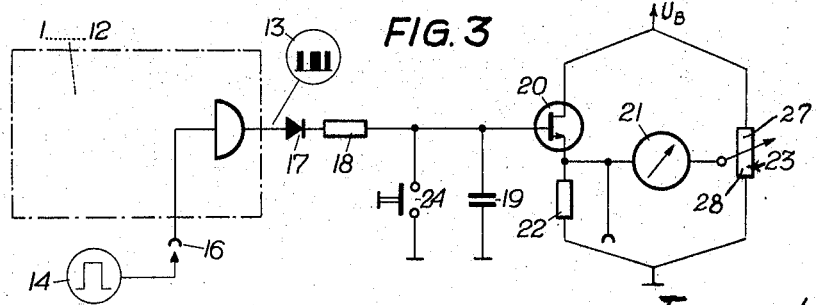

3,479,496
SWITCHING ARRANGEMENT FOR THE INTEGRATION OF INDIVIDUAL HIGH-SPEED OPERATIONS
Siegfried Buesch and Reimar Germann, Graz, Austria, assignors to Hans List, Graz, Austria
Filed Nov. 10, 1965, Ser. No. 507,193
Claims priority, application Austria, Nov. 13, 1964,
A 9,624/64
Int. Cl. G06g 7/18; G06f 7/38
U.S. Cl. 235—183
4 Claims

ABSTRACT OF THE DISCLOSURE

A switching device for the integration of single high-speed operations depending on time and having a saw-tooth generator supplying a voltage of variable frequency and having an input for receiving a time function. The device includes a voltage comparator and a recording device as a counter.

---

For certain measuring techniques it is necessary to integrate the measurands over certain definite ranges, such as time or travel sections in order to obtain the desired measuring result, such as for the computation of the total impulse imparted to a projectile by integration of the pressure as a function of time. Likewise, resilience is measured by integration from energy and travel, energy from voltage and time, electrolytically converted quantities from amperage and time, the amount of converted radioactive substances, density and many other similar measurands like the trichromatic values in colorimetry.

Integration by means of conventional instruments, such as with the aid of a Miller integrator provides inadequate results with single and top-speed processes and requires in addition subsequent interpretation or valuation of the integral curve thus obtained. Accordingly, integration by plane and elevational measurements (counting or weighing out, planimetering) or graphical integration, or else some numerical method (Simpson's rule) based on quadratic interpolation, has to be resorted to. This calls for the recording of the function to be integrated (oscillograms) and subsequent integration involving considerable loss of time and frequently also high material costs. Likewise, the majority of conventional electrical integration methods are particularly difficult to execute if integration is not to be based on time, but on some variable quantity used as a function of time. The only exception to this rule is a conventional integrator operating with mechanical integrating gears.

According to the invention, the above mentioned difficulties are overcome by the provision of a switching arrangement by means of which it is possible to apply the numerical integration method based on electronics speedily and most accurately with a minimum of switching effort. According to the invention, this switching arrangement features a frequency-modulated saw-tooth generator preferably comprising a capacitor, a four-layer diode connected in parallel with the said capacitor, a transistor with an adjustable work resistor and connected as a load resistance for the said capacitor, two resistors connected to the base of the said transistor, one of them connected to the circuit of the capacitor and the four-layer diode, the other to ground, the said two resistors supplying a constant voltage at the base of the said transistor the saw-tooth frequency being regulated by means of the adjustable load resistor of the transistor and influenced by a time function released at the input of the transistor, an impedance converter whose input is connected to the output of the said saw-tooth generator, a voltage comparator having two inputs, one input being connected to the output of the said impedance converter and receiving the periodic saw-tooth voltage of the said saw-tooth generator, the voltage to be integrated, being introduced at the second input of the said voltage comparator, an AND-gate whose one input is connected to the output of the said voltage comparator, a voltage of constant frequency being introduced at the second input of the said AND-gate, the said voltage being supplied by means of the frequency-and-width-modulated impulse voltage of the voltage comparator in impulse columns via the AND-gate to a digital counter following the latter, integration limits in the shape of a square wave pulse being initiated via the gate of the digital counter or via a third input of the AND-gate. By means of this switching arrangement the area below the curve is divided into strips of equal width, which means that the abscissa is subdivided into equal sectors by means of electronic circuitry in a manner similar to the numerical process. Integration is completed by determining the amplitudes of the area strips and by adding these up within pre-determined limits. The area included in the integrating curve $y=f(x)$ is divided into area strips by means of the saw-tooth generator. The saw-tooth voltage is produced by charging the said capacitor by means of the resistance of a transistor and its adjustable work resistance corresponding to the time constant $\tau = R.C$. The resistance of the transistor is determined by the constant bias voltage at the base of the transistor which is set by means of the said two resistances. Depending on the setting of the emitter circuit of the transistor its inner resistance will be influenced by altering the base-emitter voltage. If the voltage at the capacitor attains a value equal to the ignition voltage of said four-layer diode, the same becomes conducitve. Consequently, the capacitor discharges via the inner resistance of the conductive four-layer diode, the sequence frequency is adjustable within certain limits by altering the internal resistance of the transistor and by means of its adjustable load resistor.

If integration is to be performed depending on a certain time function, the same is fed as a variable voltage equaling $x=f(t)$ at the base of the transistor and thereby the frequency of the saw-tooth generator is influenced by the alteration of the inner resistance of the transistor. Depending on whether the voltage at the base of the transistor varies in a positive or negative direction, the inner resistance and consequently, the frequency of the saw-tooth generator is also altered. Consequently, the width of the strips will be dependent on the time function. The circuitry of the saw-tooth generator as hereabove described may be replaced by any other arrangement, such as for example, by a Miller integrator or a constant current circuit. With the two last-mentioned circuits influence is exerted as a function of $x=f(t)$ by appropriately controlling the trigger release point, that is the beginning of the saw-tooth voltage. Since in the invention the saw-tooth voltage is supplied to the voltage comparator via an emitter follower, objectionable influences upon the frequency are eliminated. In fact, the emitter-follower is provided for the separation of the saw-tooth generator circuit from the following comparator circuit. If the impedance converter did not exist, an interference resistance should be produced by the following comparator circuit in parallel with the load resistance consisting of the said transistor and its adjustable work resistor. This interference resistance would cause an alteration of the saw-tooth generator frequency. However, the emitter-follower has a very high and approximately constant resistance at its input so that no objectionable influence is exerted upon the frequency. The plainest voltage comparator comprises a Schmitt trigger whose input is connected to the comparison voltage equaling the saw-tooth voltage on the one hand, and to the voltage $y=t(x)$ to be integrated on the other hand.

In lieu of a Schmitt trigger an integrated circuit voltage comparator can be used. If the saw-tooth voltage drops, that is when the capacitor is discharged by means of the four-layer diode, the voltage comparator tilts back to its initial position and a rectangular pulse is released at the output. The square wave pulses thus produced by the comparator are of width corresponding to the amplitude of the function to be integrated. However, the width of the pulses also corresponds to the number of the frequency-constant counting frequency arriving at the counter. The counter counts and adds the impulse columns thus forming the integral of the function. The integration limits are introduced by means of the gate pulse releasing the counter during that time for the counting operation. If the counter is not provided with gate control, the gate pulse may also be released at the third input of the AND-gate.

By the appropriate selection of the saw-tooth frequency and of the counting rate a remarkable degree of accuracy and a high resolving power may be achieved. With slow operations in particular, the resolving power is mainly limited by the storage capacity of the digital counter used.

Further details and features of the switching arrangement according to the invention will appear from the following description of several embodiments of the invention with reference to the accompanying drawing in which:

FIG. 1 is a circuit diagram according to one embodiment of the invention featuring digital recording of measurands, FIG. 2 a schematic illustration of the measuring process in the shape of a diagram, and FIG. 3 is the circuit diagram of a second embodiment of the invention for analogous recording, with only the section of the circuit which differs from the one shown in FIG. 1 illustrated.

The switching arrangement comprises a saw-tooth generator 1, including a conventional four-layer diode circuit comprising a capacitor 24, a four-layer diode 2 in parallel with the former and a transistor 3 with an adjustable work resistor 4. The collector of the transistor 3 is connected to the capacitor 24 and the four-layer diode 2. To the base of the transistor 3, two resistors 25 and 26 are connected, one (25) of them being connected to the circuit of the diode 2 and of the capacitor 24. The input 5 of the saw-tooth generator 1 is connected to the base of the transistor 3 and the output of the saw-tooth generator 1 with the collector of the transistor 3. To the output of the saw-tooth generator 1, the input of an impedance converter 6 is connected, the output of which is connected to one of the two inputs of a following voltage comparator 8. The saw-tooth voltage supplied by the impedance converter 6 to the voltage comparator 8 is designated by reference number 7.

At the second input of the voltage comparator 8, the voltage 9 to be integrated is initiated. The voltage comparator 8 is followed by an AND-gate 12 with three inputs. To the output of the AND-gate 12 the input of a digital counter 15 is connected. The first input of the AND-gate 12 is connected to the output of the voltage comparator 8. At the second input of the AND-gate 12 a voltage 11 of constant frequency is applied. Integration limits in the shape of a square wave pulse 14 are initiated either via a third input of the AND-gate 12 or via the gate of the digital counter 15. Reference number 10 designates the frequency-and-width-modulated impulse voltage supplied by the voltage comparator 8 and reference number 13 one of the impulse columns arriving at the digital counter 15.

With reference to FIG. 2 the switching arrangement according to the invention operates as follows: The area included in the integrating curve $y=f(x)$ (reference number 9 in FIGS. 1 and 2) is divided into area strips of a width $x_1$ (7) by means of the saw-tooth generator 1. The width $x_1$ of the strips is determined by the sequence frequency of the saw-tooth generator 1, which can be regulated within certain limits by altering the internal resistance of the transistor 3 and by means of its adjustable load resistor.

Provided integration is not to be performed as a function of time, but as a function of some other variable quantity, such as a time function $x=f(t)$, the voltage proportional to this function is fed to the input 5 of the transistor 3 thereby making the strip width $x_1$ dependent upon the function $x=f(t)$. The saw-tooth voltage 7 released by the saw-tooth generator 1 and kept free from undesirable frequency influence by means of the emitter follower 6 is compared in the voltage comparator 8 with the function $y=f(x)$ (9) to be integrated. For the simplest design a Schmitt trigger may be used as a voltage comparator. The falling side of the saw-tooth voltage returns the Schmitt trigger to its initial position and starts the next pulse. Consequently, the voltage comparator 8 supplies a frequency-and-width-modulated impulse voltage 10 in the shape of square wave pulses, the width $B_n$ of which corresponds to the respective amplitude $y_n$ of the function $y=f(x)$ at a distance $x_n$. For the duration B of the square wave pulse 10 the voltage 11 of constant frequency is transferred as the counting rate via the AND-gate 12 to the digital counter 15. The width $B_n$ of the square wave impulses 10 corresponds to the number N of the counting rate 11 in accordance with the formulas $N_n=y_n$ and $\Sigma N=\Sigma y_n$. In order to insure smooth operation of the integration circuit, the amplitude of the saw-tooth voltage should be greater than or at least equal to the maximum amplitude of the voltage to be integrated. On the other hand, the frequency of the saw-tooth voltage should be sufficiently high and consequently, the width of the strips small enough for any substantial alteration of the functional value $y_n$ of the function to be integrated to be precluded within this strip width.

The counter 15 counts the impulse columns 13 in an adding operation and thus forms the integral of the function $y=f(x)$. The gate impulse 14 of a duration $x=n_1$ to $x=n$ provides the integration limits by releasing the counter for this period of time for the counting operation. With counters lacking gate control the gate impulse 14 is transmitted to the third input 16 of the AND-gate 12.

For the analogous recording of the process to be integrated the digital counter 15 is replaced by the circuit section illustrated in FIG. 3. The input of this circuit section is provided by a diode 17 followed by a resistor 18 connected with the input of a field-effect transistor 20. A capacitor 19 dischargeable via a switch 24 is connected in series with the resistor 18. The work resistance of the field-effect transistor 20 is designated by reference number 22. The inner resistance of the field-effect transistor 20 and the resistance 22 together define one branch of a measuring bridge, the other branch of which comprises two sections 27 and 28 of a potentiometer 23, the ratio between the resistances of the two potentiometer sections 27 and 28 being determined by the position of the potentiometer collector ring. The measuring bridge is inserted between the frame and the feed voltage $U_B$. In the diagonal of the measuring bridge a moving-coil measuring instrument 21 is provided which is connected to the source of the field-effect transistor 20 on the one hand, and to the collector ring of the potentiometer 23 on the other hand. The equilibrium of the bridge is adjustable by means of the potentiometer collector ring. The integration voltage for oscillograph recordings is readable on the load resistance 22 of the field-effect transistor 20.

The operation of the circuit section hereabove described is as follows: The impulse columns 13 arriving from the AND-gate 12 charge the capacitor 19 via a diode 17 and the resistor 18. The charge of the capacitor 19 which is proportionate to the number of pulses, is measured via the field-effect transistor 20 with the moving-coil measuring instrument in bridge connection. The charging voltage which is readable on the load resistance 22 can be delivered to an oscillograph for the purpose of recording the integration process. The charging voltage is the voltage prevailing at the capacitor 19. Assuming the charge Q at the capacitor 19 to be $$Q = \int i dt$$

the voltage U at the capacitor 19 will be $$U = \frac{Q}{C} = \int \frac{i dt}{c}$$

With this type of circuit the diode 17 prevents the discharge of the capacitor 19 if the input voltage drops below the value of the voltage stored in the capacitor 19. On the other hand, the high input voltage of the field-effect transistor 20 prevents the charge accumulated at the capacitor 19 from flowing away. Upon completion of the measuring operation the charge of the capacitor 19 is eliminated via the switch 24.

We claim:
1. A switching arrangement for the integration of single high-speed operations depending on time or any other functions depending on time, comprising a saw-tooth generator supplying a saw-tooth voltage of variable frequency, and having an input for receiving a time function influencing the frequency of the said saw-tooth voltage, an emitter-follower whose input is connected to the output of the said saw-tooth generator, a voltage comparator having two inputs, one of the said inputs being connected to the output of the said emitter-follower, the second input of the voltage comparator receiving the voltage to be integrated, and an AND-gate having three inputs, one of which is connected to the output of the said voltage comparator, the second input of the said AND-gate being connected to a voltage generator supplying voltage of a constant frequency, the third input of the said AND-gate being provided for the reception of integration limits for the voltage to be integrated in the shape of square-wave pulses and a recording device connected to the output of the said AND-gate.

2. A switching arrangement according to claim 1, in which the said saw-tooth generator comprises a capacitor, a four-layer diode in parallel with the said capacitor, a transistor with an adjustable work resistor, the input of the saw-tooth generator being connected to the base of the transistor, the transistor serving as a charging resistance for the said capacitor, two resistors connected to the base of the said transistor, one of the said resistors being connected to the circuit of the capacitor and of the four-layer diode, the said two resistors supplying a constant voltage at the base of the said transistor, the frequency of the said saw-tooth voltage being adjustable by means of the said controllable work resistor of the transistor.

3. A switching arrangement according to claim 1, in which the said recording device comprises a circuit section for the analogous recording of the process to be integrated, including a diode connected to the output of the said AND-gate, a resistor connected to the output of the said diode, a capacitor connected in series to the said resistor, a discharge switch for the said capacitor in parallel with same, a field-effect transistor, the input of which is connected to the said capacitor, a work resistor connected to the source of the said field-effect transistor, a measuring bridge having two arms, one of which is formed by the inner resistance of the field-effect transistor and the said work resistance, the other arm of the bridge consisting of the two sections of a potentiometer, the said sectors being determined by the position of the potentiometer collector ring, the two arms of the bridge being interpolated between the frame and the feed voltage, a moving-coil measuring instrument arranged in the diagonal of the said measuring bridge and connected between the source of the said field-effect transistor and the said potentiometer collector ring, one output connected to the source of the field-effect transistor for receiving the integration voltage for oscillograph recordings.

4. A switching arrangement for the integration of single high-speed operations depending on time or any other functions depending on time, comprising a saw-tooth generator supplying a saw-tooth voltage of variable frequency, and having an input for receiving a time function influencing the frequency of the said saw-tooth voltage, an emitter-follower whose input is connected to the output of the said saw-tooth generator, a voltage comparator having two inputs, one of the said inputs being connected to the output of the said emitter-follower, the second input of the voltage comparator receiving the voltage to be integrated, and an AND-gate having two inputs, one of which is connected to the output of the said voltage comparator, the second input of the said AND-gate being connected to a voltage generator supplying voltage of a constant frequency, and a digital counter connected to the output of said AND-gate and having a counter enable input provided for receiving integration limits in the shape of a rectangular pulse, the length of which defines said integration limits, so that said counter is effective to count the pulses passing the said AND-gate only while said rectangular pulse is applied, the readings of the said counter corresponding to the integral of the function to be integrated.

References Cited

UNITED STATES PATENTS 3,296,613    1/1967    Andersen et al.    340—347
3,358,200    12/1967    Clifford    235—183 X

OTHER REFERENCES

MacArthur & Ungar: Digital Recorder For Wind-Tunnel Data. Electronics Eng. Issue, Dec. 5, 1958, pp. 86–89.

MALCOLM A. MORRISON, Primary Examiner

F. D. GRUBER, Assistant Examiner

U.S. Cl. X.R.

235—92; 307—228, 235, 324; 328—127, 146; 340—347